United States Patent
Arai et al.

[11] Patent Number: 6,125,953
[45] Date of Patent: Oct. 3, 2000

[54] COUPLING DEVICE BETWEEN LEFT AND RIGHT WHEELS OF VEHICLE

[75] Inventors: Kentaro Arai; Tetsuro Hamada, both of Tochigi-ken, Japan

[73] Assignee: Honda Giken Kogyo Kabushiki Kaisha, Tokyo, Japan

[21] Appl. No.: 09/154,173

[22] Filed: Sep. 16, 1998

[30] Foreign Application Priority Data

Sep. 18, 1997 [JP] Japan .................................. 9-253070

[51] Int. Cl.⁷ ...................................................... B62D 6/02
[52] U.S. Cl. ........................ 180/6.28; 180/6.5; 180/65.2; 180/243
[58] Field of Search ................................... 180/242, 243, 180/65.2, 65.6, 65.7, 6.28

[56] References Cited

U.S. PATENT DOCUMENTS

| | | | |
|---|---|---|---|
| 5,839,535 | 11/1998 | Arai | 180/197 |
| 6,008,606 | 12/1999 | Arai et al. | 318/431 |
| 6,024,182 | 2/2000 | Hamada et al. | 180/6.28 |

FOREIGN PATENT DOCUMENTS 2308344  6/1997  United Kingdom .

*Primary Examiner*—Kevin Hurley
*Assistant Examiner*—Andrew J. Fischer
*Attorney, Agent, or Firm*—Armstrong, Westerman, Hattori, McLeland & Naughton

[57] ABSTRACT

A coupling device to be provided between left and right wheels of a vehicle has an electric motor and a switching mechanism switchable between a starting assistance state in which a torque is transmitted in the same direction of rotation from the electric motor to left and right wheels, and a cornering assistance state in which a torque for acceleration is transmitted from the electric motor to one of the left and right wheels. When the switching state of the switching mechanism is for starting assistance control, lamps in the central indicator of an indicating device are lighted in a number corresponding to the electric current value of the electric motor. When the switching state is for cornering assistance control, the lamps of the left and right indicators corresponding to the outer wheel are lighted in a number corresponding to the electric current value.

2 Claims, 3 Drawing Sheets

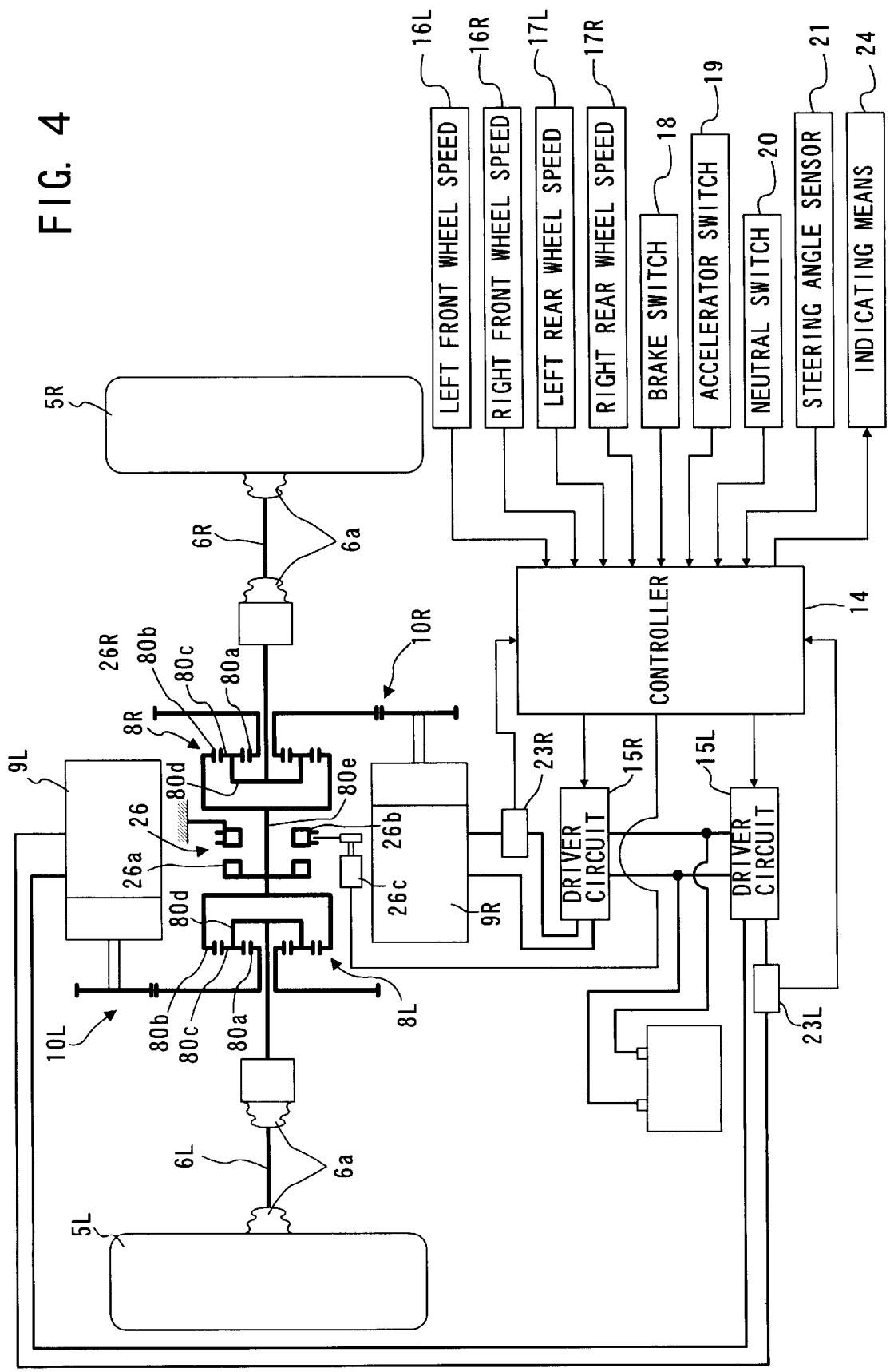

COUPLING DEVICE BETWEEN LEFT AND RIGHT WHEELS OF VEHICLE

BACKGROUND OF THE INVENTION

1. Technical Field of the Invention

The present invention relates to a coupling device to be provided between left and right wheels of a vehicle such as a motor vehicle, in particular between the left and right idler wheels that are not driven by an engine.

2. Description of the Related Art

Conventionally, as this kind of coupling device, there is known, in Japanese Published Unexamined Patent Application No. 79348/1997, a coupling device comprising: an electric motor; and a switching mechanism which can be switched between the following two states, i.e., a state in which the starting of a vehicle is assisted by transmitting a toque from the electric motor to the left and right wheels in the same direction of rotation, and a state in which cornering of the vehicle is assisted by transmitting from the electric motor to one of the left and right wheels a torque to accelerate said one of the wheels relative to the other of the wheels.

At the time of starting or cornering of the vehicle, it is desirable to indicate an operating condition of the coupling device to inform a driver of the vehicle whether a starting assistance or cornering assistance is being performed or not.

The present invention has an object of providing between the left and right wheels a coupling device which is suitable to meet this kind of desire.

SUMMARY OF THE INVENTION

In order to attain the above-described object, there is provided a coupling device to be provided between left and right wheels of a vehicle having: an electric motor; and a switching mechanism switchable between a state in which a torque is transmitted in the same direction of rotation from the electric motor to left and right wheels to thereby perform a starting assistance control of the vehicle, and a state in which a torque is transmitted from the electric motor to one of the left and right wheels in order to accelerate said one of the wheels relative to the other of the wheels to thereby perform a cornering control of the vehicle; wherein the coupling device further comprises: indicating means for indicating operating conditions of the coupling device based on an electric current value of the electric motor and a switching state of the switching mechanism.

In the electric motor, the torque becomes larger in proportion to the magnitude of the electric current value. Therefore, if the magnitude of the electric current value is known, the magnitude of the torque to be transmitted from the electric motor to the wheel is also known. Further, from the switching conditions of the switching mechanism, it can be seen which of the starting assistance control and the cornering assistance control is being performed. Therefore, if the operating conditions of the coupling device are indicated based on the electric current value of the electric motor and the switching condition of the switching mechanism, it becomes possible to see the state of the starting assistance control and the cornering assistance control. The value of the vehicle as a commercial commodity is improved. Further, from the indicated contents of the indicating means, the presence or absence of troubles can be easily discriminated.

Further, as a coupling device to be provided between left and right wheels of a vehicle, there is one which has a pair of left and right electric motors and in which a starting assistance control is performed by transmitting a torque in the same direction of rotation from each of the electric motors to corresponding one of left and right wheels and in which a cornering assistance control is performed by transmitting a torque in a normal direction of rotation from one of the left and right electric motors to a corresponding one of the left and right wheels and by transmitting a torque in a reverse direction of rotation from the other of the electric motors to the other of the left and right wheels. In this coupling device, it can be seen from the directions of rotation of the electric motors which of the starting assistance control and the cornering assistance control is being performed. Therefore, the operating conditions of the coupling device can be indicated by indicating means for indicating the operating conditions of the coupling device based on electric current values and directions of rotation of the electric motors.

BRIEF DESCRIPTION OF THE DRAWINGS

FIG. 4 is a skeleton diagram showing the arrangement of an important portion of another embodiment of the coupling device of the present invention.

DETAILED DESCRIPTION OF PREFERRED EMBODIMENTS

Figure 1:
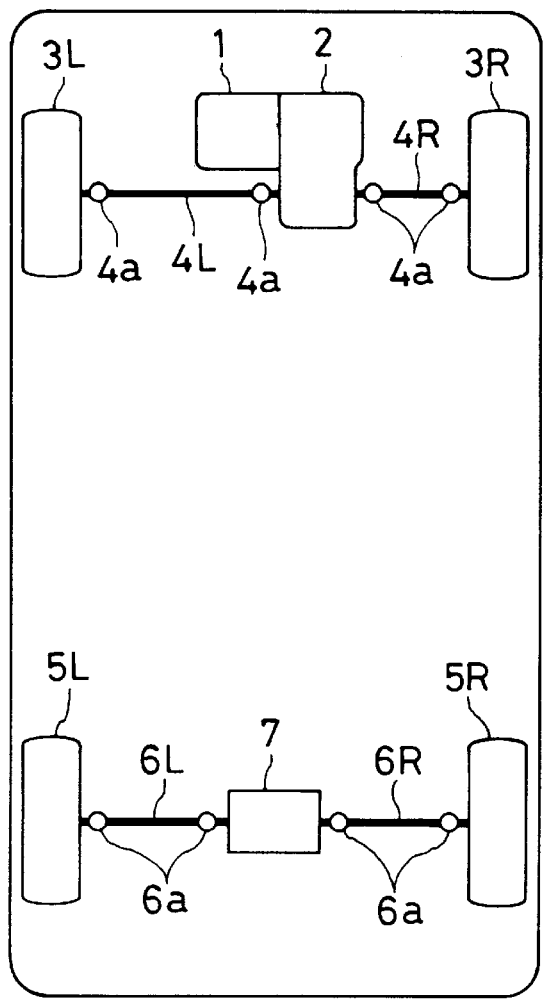
FIG. 1 is a schematic diagram showing an example of using the coupling device of the present invention.

FIG. 1 shows a front-wheel-drive vehicle in which the left and right front wheels 3L, 3R are driven by an engine 1 via a transmission 2. Each of the front wheels 3L, 3R is coupled to the transmission 2 via each drive shaft 4L, 4R which has respectively constant velocity joints 4a on both ends of the drive shaft. To each of the left and right rear wheels 5L, 5R, which are idler wheels, there is connected a coupling shaft 6L, 6R which has respectively constant velocity joints 6a on both ends of the coupling shaft. A coupling device 7 is interposed between both the coupling shafts 6L, 6R.

Figure 2:
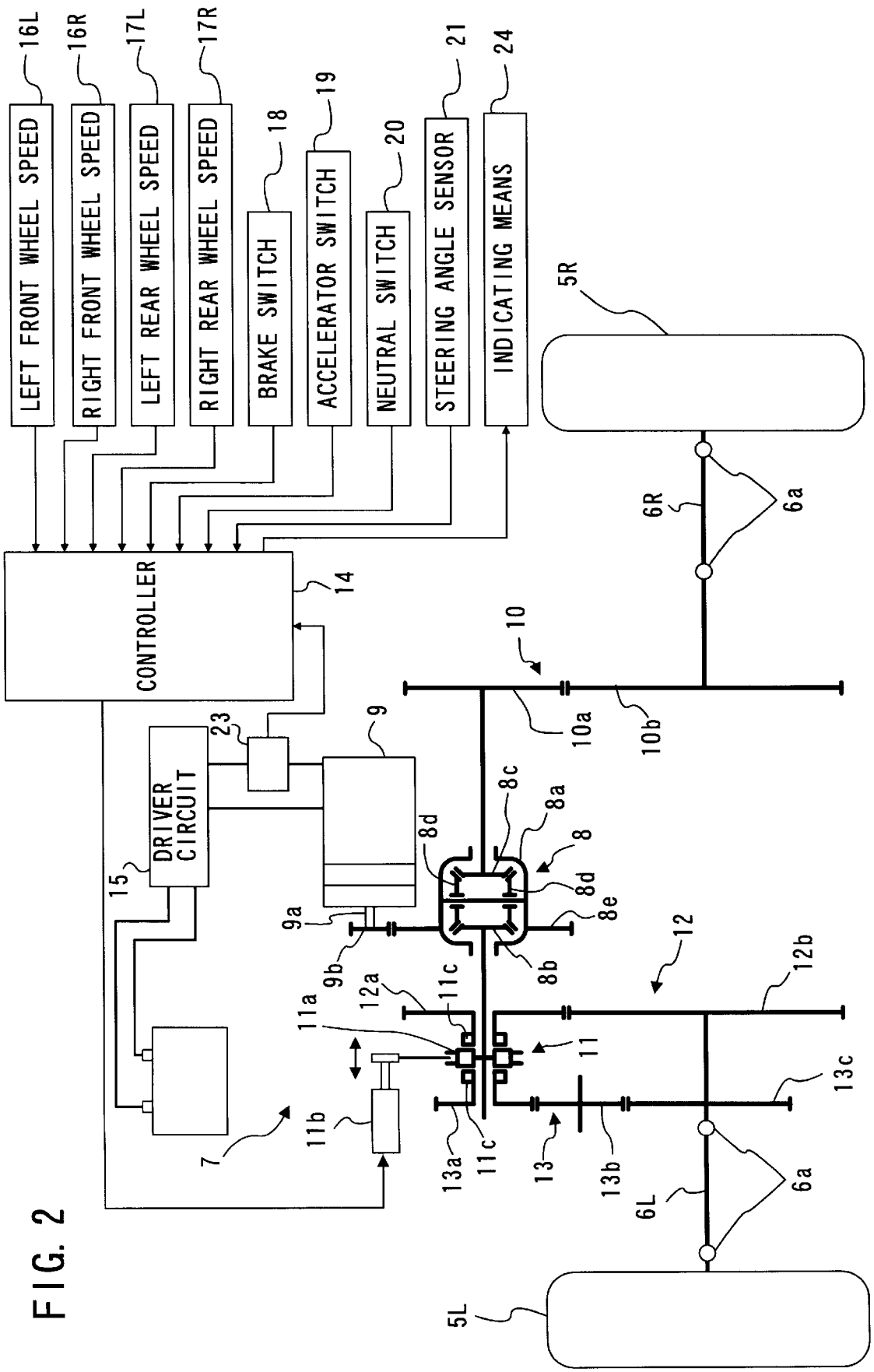
FIG. 2 is a skeleton diagram showing the arrangement of an important portion of an embodiment of the coupling device of the present invention.

The coupling device 7 is provided, as shown in FIG. 2, with a differential gear 8 and an electric motor 9. The differential gear 8 is constituted by a bevel gear type of differential gear which is made up of: a differential gear case 8a which rotatably supports a pair of left and right side gears 8b, 8c comprising bevel gears and which also rotatably supports a pair of pinions 8d which are geared with both the side gears 8b, 8c; and a ring gear 8e which is fixed to the differential gear case 8a. The side gear 8c on the right side is coupled to the constant velocity joints 6a on the coupling shaft 6R for the right rear wheel 5R via a first power transmission system 10. The side gear 8b on the left side is coupled to the constant velocity joints 6a for the left rear wheel 5L via second and third power transmission systems 12, 13 which are selectively established by a selector 11. The ring gear 8e is geared with a gear 9b on an output shaft 9a of the electric motor 9. The electric motor 9 contains therein a planetary type of reduction gear. The electric current to be supplied from a battery BAT to the electric motor 9 is controlled by a controller (electronic control unit, ECU) 14 via a driver circuit 15.

Each of the first and second power transmission systems 10, 12 is constituted by a gear train which is made up of a driving gear 10a, 12a and a driven gear 10b, 12b. The gear ratio of each of the power transmission systems 10, 12 is set identical to the other. The third power transmission system 13 is constituted by a gear train which is made up of a driving gear 13a, an intermediate idler gear 13b, and a driven gear 13c. Its gear ratio is set to a gear ratio which is opposite in direction to, but is equal in absolute value to, the gear ratio of the above-described power transmission system 10 or 12.

The selector 11 is constituted by a dog clutch having an axially movable dog member 11a which is provided on a gear shaft of the side gear 8b so as to be positioned between the driving gears 12a, 13a of the second and third power transmission systems 12, 13. By moving the movable dog member 11a by a solenoid 11b, which is controlled by the controller 14, so as to be selectively engaged with either one of stationary dog members 11c, 11c which are coupled to the driving gears 12a, 13a of the power transmission systems 12, 13, the driving gears 12a, 13a are selectively coupled to the side gear 8b.

According to this arrangement, when the driving gear 12a is coupled to the side gear 8b by the selector 11 to thereby establish the second power transmission system 12, torques that are the same with each other in the direction of rotation are transmitted from the electric motor 9 to the left and right rear wheels 5L, 5R via each of the first and second power transmission systems 10, 12. When the driving gear 13a is coupled to the side gear 8b via the selector 11 to thereby establish the third power transmission system 13, torques which are opposite to each other in direction are transmitted to the left and right rear wheels 5L, 5R from the electric motor 9 via the differential gear 8 and each of the first and third power transmission systems 10, 13. One of the left and right rear wheels is thus accelerated relative to the other of the left and right rear wheels. In this manner, there is constituted a switching mechanism which can be switched between the following two states, i.e., a state in which torques are transmitted from the electric motor 9 to the left and right wheels 5L, 5R in the same direction of rotation, and a state in which a torque is transmitted from the electric motor 9 to one of the left and right wheels 5L, 5R so as to accelerate said one of the rear wheels relative to the other of the rear wheels.

The following arrangement may also be made. Namely, the driving gears 12a, 13a of the second and third power transmission systems 12, 13 are directly coupled to the side gear 8b, and the driven gears 12b, 13b of both the power transmission systems 12, 13 are selectively coupled to the constant velocity joints 6a via a selector. Further, the second power transmission system 12 and the third power transmission system 13 are provided with a respective clutch which is made up of a dog clutch, an electromagnetic clutch, or the like. It is thus so arranged that, by engaging one of the clutches, the corresponding one of the power transmission systems is operated. However, in order to simplify the coupling device, the illustrated embodiment in which a common dog clutch is used is more suitable.

To the controller 14, there are inputted signals of the following, i.e., wheel speed sensors 16L, 16R which detect the speeds of the left and right front wheels 3L, 3R, wheel speed sensors 17L, 17R which detect the speeds of the left and right rear wheels 5L, 5R, a brake switch 18, an accelerator switch 19, a neutral switch 20, a steering angle sensor 21, or the like. The controller 14 discriminates the running conditions of the vehicle based on these signals, and performs starting assistance control and cornering assistance control wherever necessary.

The starting assistance control is performed on a slippery road such as a snowy road. In concrete, this control is performed when the following conditions are satisfied: namely, the speeds of the rear wheels 5L, 5R are below a predetermined value; the difference in speeds between the front wheels 3L, 3R and the rear wheels 5L, 5R is above a predetermined value; the brake switch 18 is switched off; the accelerator switch 19 is switched on; and the neutral switch 20 is switched off (i.e., in a non-neutral condition). In the starting assistance control, the movable dog member 11a is engaged with the stationary dog member 11c of the driving gear 12a in the second power transmission system 12 to thereby establish the second power transmission system 12. In this state, the gear 9b of the electric motor 9 is rotated in the normal direction of rotation (at the time of forward running) or in the reverse direction of rotation (at the time of reverse running). By these operations, the rotational force is equally transmitted from the pinion 8d of the differential gear 8 to the left and right side gears 8b, 8c. As a result, the left and right rear wheels 5L, 5R are rotated in the same direction of rotation via the first and second power transmission systems 10, 12, whereby the starting assistance is performed.

In the cornering assistance control, which is performed at the time of cornering after the vehicle has started, the movable dog member 11a is engaged with the stationary dog member 11c of the driving gear 13a of the third power transmission system 13 to thereby establish the third power transmission system 13. In this state, the electric motor 9 is rotated in the normal direction or in the reverse direction. For example, when the vehicle corners (or turns) toward the right, the electric motor 9 is rotated in the normal direction to thereby accelerate the left rear wheel 5L, which is an outer wheel, and to also decelerate the right rear wheel 5R, which is an inner wheel. As a result, a driving force is added to the left rear wheel 5L which is the outer wheel, and a braking force is applied to the rear right wheel 5R which is the inner wheel. A yawing moment thus occurs in the direction of turning to the right, whereby a cornering assistance is performed. On the other hand, when the vehicle corners toward the left, the electric motor 9 is rotated in the reverse direction to decelerate the left rear wheel 5L, which is an inner wheel, whereby a braking force is applied thereto. Also, the right rear wheel 5R, which is an outer wheel, is accelerated to add a driving force thereto, whereby a cornering assistance is performed.

In the coupling device 7 of this embodiment, as shown in FIG. 2, there is provided an electric current detector 23 which detects an electric current value of the electric current to be supplied from the driver circuit 15 to the electric motor 9. A signal which indicates the electric current value is inputted to the controller 14. Further, there is connected to the controller 14 an indicating means 24 which indicates the operating conditions of the coupling device 7 based on the electric current value and the switching conditions of the switching mechanism. The switching conditions of the switching mechanism can be discriminated by which of the second and third power transmission trains 12, 13 is established.

Figure 3:
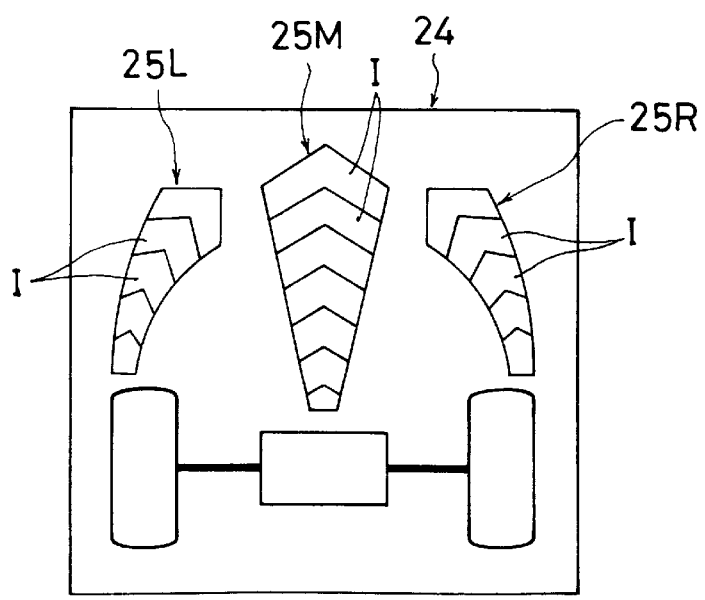
FIG. 3 is a front view showing an embodiment of an indicating means.

The indicating means 24 is provided, as shown in FIG. 3, with a total of three indicators 25M, 25L, 25R which indicate on a real time basis the magnitude of an absolute value of the electric current value in the center and on left and right sides thereof. Each of the indicators 25M, 25L, 25R is made up of an accumulation (or a combination) of substantially doglegged lamps I. The magnitude of the absolute value of the electric current value is indicated by the number of lamps I that are switched on.

Among them, the indicator 25M indicates the absolute value of the electric current value of the electric motor 9 when the second power transmission system 12 is established by the selector 11 to thereby transmit the torques of the same direction of rotation from the electric motor 9 to the left and right rear wheels 5L, 5R, i.e., at the time of performing the starting assistance control. Each of the indicators 25L, 25R indicates the magnitude of the absolute value of the electric current value of the electric motor 9 when the third power transmission system 13 is established by the selector 11 to transmit torques which are opposite to each other in direction from the electric motor 9 to the left and right rear wheels 5L, 5R, whereby one of the rear wheels is accelerated relative to the other thereof, i.e., at the time of performing the cornering assistance control. At the time of cornering toward the right when the electric motor 9 rotates in the normal direction, indication is made on the indictor 25L. At the time of cornering toward the left when the electric motor 9 is rotated in the reverse direction, indication is made on the indicator 25R.

Therefore, the driver of the vehicle can recognize the following: i.e., by the lighting of the lamps I of the indicator 25M, that the starting assistance control is being performed; by the lighting of the lamps I of the indicator 25L, that the cornering assistance to the right is being performed; and, by the lighting of the lamps I of the indicator 25R, that the cornering assistance to the left is being performed. Based on the number of lamps I that are lighted or switched on, the magnitude of the torques to be transmitted to the left and right rear wheels 5L, 5R can be recognized. In this manner, by indicating the operating conditions of the coupling device based on the electric current value of the electric motor 9 and the switching condition of the switching mechanism, the states of the starting assistance and the cornering assistance can be seen. The value of the vehicle as a commercial commodity is improved.

FIG. 4 shows a second embodiment of the coupling device. This coupling device is different from that of the first embodiment in that there are provided a pair of left and right differential gears 8L, 8R, a pair of electric motors 9L, 9R, and a brake means 26. The same reference numerals are attached to those members that are the same as those of the first embodiment, and their explanations have been omitted.

Each of the differential gears 8L, 8R is constituted by a planetary type of differential gear which is made up of a sun gear 80a, a ring gear 80b, and a carrier 80d which supports planetary gears 80c to be engaged with both the gears 80a and 80b. Each of the electric motors 9L, 9R is coupled to the sun gear 80a of each of the differential gears 8L, BR via reduction gear trains 10L, 10R, respectively. The carrier 80d of each of the differential gears 8L, 8R is coupled to the constant velocity joints 6a of each of the coupling shafts 6L, 6R. Further, the ring gears 80b of both the differential gears 8L, BR are coupled to each other via an intermediate shaft 80e. Each of the differential gears 8L, 8R may also be constituted by a bevel gear type of differential gear which is made up of: a differential gear case which rotatably supports a pair of left and right side gears comprising bevel gears and which also rotatably supports a pair of pinions which are engaged with both the side gears; and a ring gear which is fixed to the differential gear case. The amount of electric current of each of the electric motors 9L, 9R is controlled, like in the first embodiment, by the controller 14 via each of the driver circuits 15L, 15R.

A brake means 26 is to restrain (or restrict) the rotation of the ring gear 80b of both the differential gears 8L, 8R. It is constituted by a dog clutch mechanism which is made up of a stationary dog member 26a which is fixed to an intermediate shaft 80e, and a movable dog member 26b which is prevented from rotating relative to the casing of the coupling device 7 and which is movable back and forth in the axial direction. The movable dog member 26b is moved back and forth by a solenoid 26c which is controlled by the controller 14. It is thus engaged with, and disengaged from, the stationary dog member 26a to thereby perform the restraining (or restriction) and releasing of the ring gear 80b.

In the starting assistance control of the coupling device 7 having the above-described arrangement, the brake means 26 is switched on to thereby restrain both the differential gears 8L, 8R. Then, in this state, both the electric motors 9L, 9R are rotated in the same direction.

In this case, the ring gears 80b function as reaction force receiving members. The carriers 80d, 80d of both the differential gears 8L, 8R are thus rotated in the same direction via the sun gears 80a, 80a. The torques are transmitted to the left and right rear wheels 5L, 5R in the same direction, whereby a starting assistance control is performed.

Once the vehicle has started, the brake means 26 is switched off to thereby release the restraining of the ring gear 80b. In the cornering assistance control which is to be performed at the time of subsequent cornering, both the electric motors 9L, 9R are rotated in the directions which are opposite to each other. For example, when the vehicle corners toward the right, the electric motor 9L on the left side is rotated in the normal direction and the electric motor 9R on the right side is rotated in the reverse direction. According to these operations, the sun gear 80a of the differential gear 8L is rotated in the normal direction, and the carrier 80d thereof is rotated in the normal direction relative to the ring gear 80b. The sun gear 80a of the differential gear 8R is rotated in the reverse direction and the carrier 80d thereof is rotated in the reverse direction relative to the ring gear 80b. In this case, a reaction force in the reverse direction of rotation is applied to the ring gear 80b of the differential gear 8R, and a reaction force in the normal direction of rotation is applied to the ring gear 80b of the differential gear 8R. However, since both the ring gears 80b, 80b are coupled to each other, both the reaction forces are canceled or offset each other. Therefore, based on the rotational speed of both the ring gears 80b, 80b, the carrier 80d of the differential gear 8L, i.e., the left rear wheel 5L is accelerated, and the carrier 80d of the differential gear 8R, i.e., the left rear wheel 5R is decelerated. As a result, the driving force is given to the rear left wheel 5L which is an outer wheel, and a braking force is applied to the rear right wheel 5R which is an inner wheel, whereby a yawing moment occurs in the direction of cornering toward the right. A cornering assistance is thus performed. When the vehicle corners toward the left, the electric motor 9L on the left side is rotated in the reverse direction to decelerate the left rear wheel 5L, which is an inner wheel, and the electric motor 9R on the right side is rotated in the normal direction to accelerate the right rear wheel 5R which is an outer wheel.

In the coupling device 7 of the second embodiment, the following arrangement is employed. Namely, electric current detectors 23L, 23R are interposed between each of the electric motors 9L, 9R and each of the driver circuits 15L, 15R. The electric current value detected by each of the electric current detectors 23L, 23R is inputted into the controller 14. The indicating means 24 which indicates the operating conditions of the coupling device 7 based on the electric current value and the rotational direction of the electric motors 9L, 9R is connected to the controller 14. The indicating means 24 has the same constitution as that of the above-described embodiment and is provided with a total of three indicators 25M, 25L, 25R. The direction of rotation of the electric motors 9L, 9R can be detected, for example, by the direction of the electric current.

The indicator 25M indicates the magnitude of the sum of the absolute values of the electric current values of both the electric motors 9L, 9R at the time when each of the electric motors 9L, 9R rotates in the same direction to thereby transmit to the left and right rear wheels 5L, 5R the torque in the same direction of rotation, i.e., when the starting assistance control is being performed. The indicators 25L, 25R indicate the magnitude of the sum of the absolute values of the electric current values of both the electric motors 9L, 9R at the time when each of the electric motors 9L, 9R is rotated in the direction opposite to the other to thereby transmit the torque in the opposite direction, i.e., when the cornering assistance control is being performed. The magnitude of the absolute values is indicated in the indicator 25L at the time of cornering toward the right when the electric motor 9L on the left side is rotated in the normal direction, and is indicated in the indictor 25R at the time of cornering toward the left when the electric motor 9R on the right side is rotated in the normal direction.

Therefore, like in the first embodiment, by seeing which lamps I of the indicators 25M, 25L, 25R are being lighted, the driver of the vehicle can recognize which of the controls of the starting assistance control, the cornering assistance control in the cornering toward the right, and the cornering assistance control in the cornering toward the left is being performed. The driver can thus recognize the magnitude of the torque to be transmitted by the lighting condition of the lamps I. Therefore, by enabling the driver to recognize the operating conditions of the coupling device 7, the value of the vehicle as a commercial commodity is improved.

In the above-described second embodiment, when the operating conditions of the coupling device 7 are indicated in the indicating means 24, recognition is made as to whether the vehicle is in the state of the starting assistance control or in the state of the cornering assistance control depending on whether the direction of rotation of the electric motors 9L, 9R is the same or not. In this coupling device 7 the switching mechanism to be switchable between the following two states, i.e., a state in which a torque in the same direction of rotation is transmitted to the left and right wheels 5L, 5R from the electric motors 9L, 9R to thereby perform the starting assistance control, and a state in which a torque for acceleration is transmitted to one of the left and right rear wheels and a braking torque is transmitted to the other of the rear wheels to thereby perform the cornering assistance control is constituted by means of the differential gears 8L, 8R, the intermediate shaft 80e, the left and right reduction gear trains 10L, 10R, and the brake means 26. It is thus also possible to discriminate the switching conditions of the switching mechanism based on the switching on and switching off of the brake means 26. Therefore, the following arrangement may also be employed. Namely, the electric current value of, for example, the left electric motor 9L out of the left and right electric motors 9L, 9R is detected. At the time of starting assistance control at which the brake means 26 is switched on, the lamps I of the indicator 25M are lighted depending on the electric current value of the electric motor 9L. At the time of the cornering assistance control in cornering toward the right at which the electric motor 9L is rotated in the normal direction and the brake means 26 is switched off, the lamps of the indicator 25L are lighted depending on the electric current value of the electric motor 9L. Further, at the time of the cornering assistance control in cornering toward the left at which the electric motor 9L is rotated in the reverse direction and the brake means 26 is switched off, the lamps of the indicator 25R are lighted depending on the electric current value of the electric motor 9L.

As explained hereinabove, according to the present invention, by indicating the operating conditions of the coupling device, the states of the starting assistance control and the cornering assistance control can be seen. Therefore, the value of the vehicle as a commercial commodity is improved. The presence and absence of problems in the vehicle can also be easily recognized.

It is readily apparent that the above-described coupling device to be provided between left and right wheels of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A coupling device to be provided between left and right wheels of a vehicle having:

an electric motor; and a switching mechanism switchable between a state in which a torque is transmitted in the same direction of rotation from said electric motor to left and right wheels to thereby perform a starting assistance control of the vehicle, and a state in which a torque is transmitted from said electric motor to one of left and right wheels in order to accelerate said one of the wheels relative to the other of the wheels to thereby perform a cornering assistance control of the vehicle;

wherein said coupling device further comprises:

indicating means for indicating operating conditions of said coupling device based on an electric current value of said electric motor and a switching state of said switching mechanism.

2. A coupling device to be provided between left and right wheels of a vehicle, said coupling device having a pair of left and right electric motors:

in which a starting assistance control is performed by transmitting a torque in the same direction of rotation from each of said electric motors to corresponding one of left and right wheels; and in which a cornering assistance control is performed by transmitting a torque in a normal direction of rotation from one of said left and right electric motors to a corresponding one of the left and right wheels and by transmitting a torque in a reverse direction of rotation from the other of said electric motors to the other of the wheels, said coupling device comprising indicating means for indicating operating conditions of said coupling device based on electric current values and directions of rotation of said electric motors.

* * * * *